United States Patent [19]

Masuzaki et al.

[11] Patent Number: 5,235,681
[45] Date of Patent: Aug. 10, 1993

[54] IMAGE FILING SYSTEM FOR PROTECTING PARTIAL REGIONS OF IMAGE DATA OF A DOCUMENT

[75] Inventors: Hidefumi Masuzaki, Hadano; Satoshi Ito, Odawara; Hiromichi Fujisawa, Tokorozawa; Masaaki Fujinawa, Nishitama; Nobuyuki Minowa; Akihisa Hirasawa, both of Odawara, all of Japan

[73] Assignee: Hitachi, Ltd., Tokyo, Japan

[21] Appl. No.: 810,541

[22] Filed: Dec. 19, 1991

Related U.S. Application Data

[63] Continuation of Ser. No. 369,854, Jun. 22, 1989, abandoned.

[30] Foreign Application Priority Data

Jun. 22, 1988 [JP] Japan ................................ 63-152289
Apr. 12, 1989 [JP] Japan .................................. 1-90713

[51] Int. Cl.⁵ .............................................. G06F 15/62
[52] U.S. Cl. ...................................... 395/164; 395/145
[58] Field of Search ............................. 395/144–148, 395/164–166; 340/750, 798–800

[56] References Cited

U.S. PATENT DOCUMENTS 4,621,321 11/1986 Boebert et al. ...................... 364/200
4,713,753 12/1987 Boebert et al. ............. 364/825.34 X

OTHER PUBLICATIONS

Zager and Chase, *Using Microsoft WORD* 2nd Edition, Que Corporation, 1987, pp. 36–49.
Zager and Chase, *Using Microsoft WORD*, 1987, pp. 11–12, 163–165.

Primary Examiner—Heather R. Herndon
Attorney, Agent, or Firm—Antonelli, Terry, Stout & Kraus

[57] ABSTRACT

A partial region of an image is set as being a secret region and an ID code is put to data concerning this secret region, the data then being stored in a memory, so that, unless an ID code which is input from a keyboard is coincident with the stored ID code, the image is selectively prevented from being displayed on a CRT display, printed by a printer, or subjected to additional writing, revision, cutting on the display screen. Thus, it is possible to restrict the visual output or revision of secret portions of images and therefore possible to individually control images which need to be kept secret and those which need not.

10 Claims, 9 Drawing Sheets

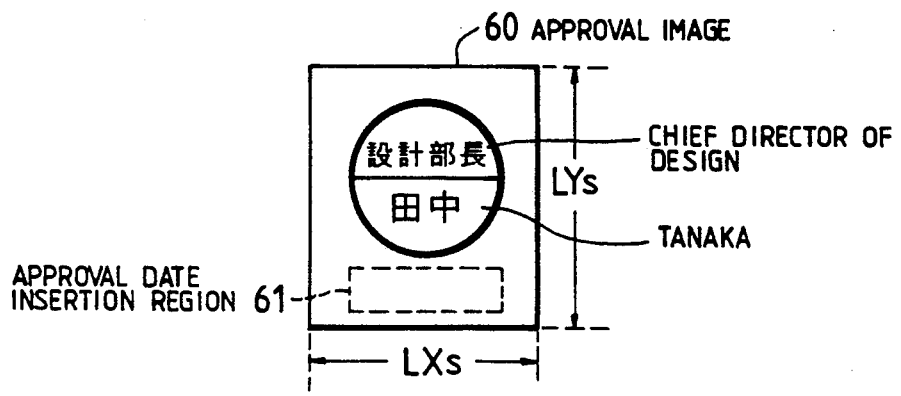
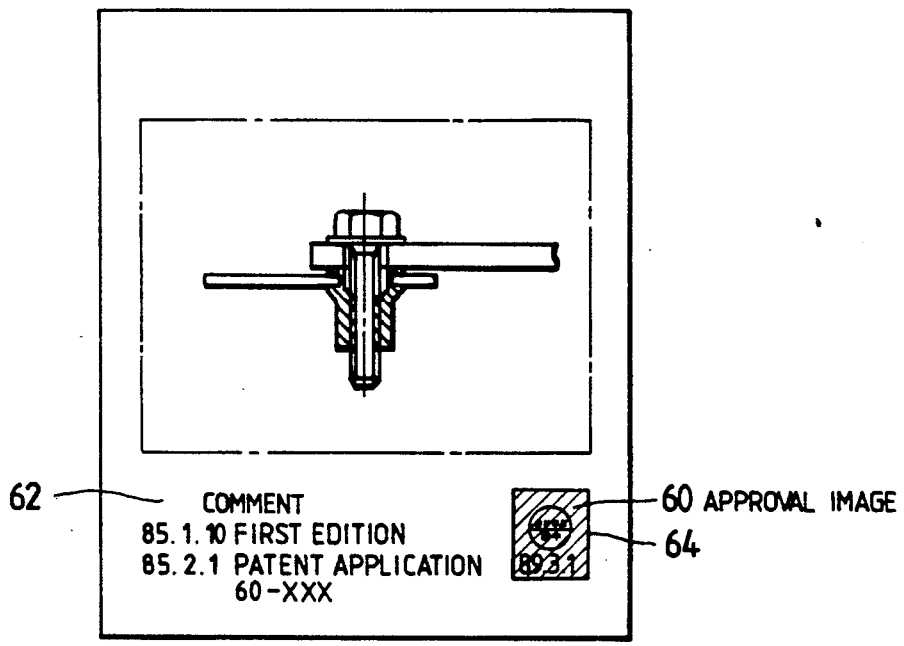

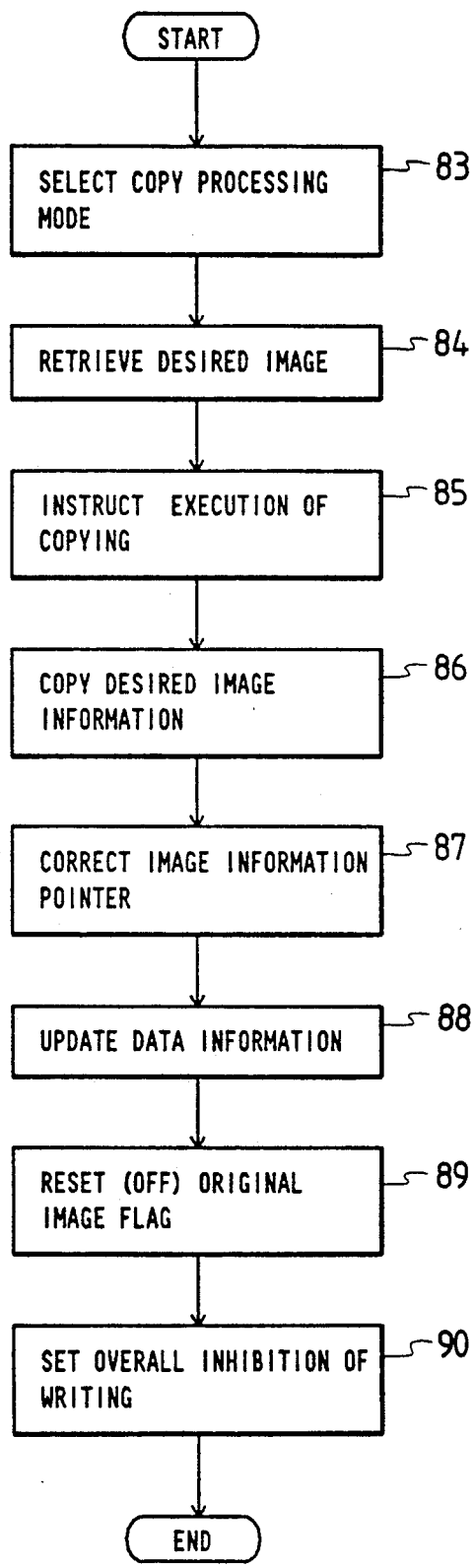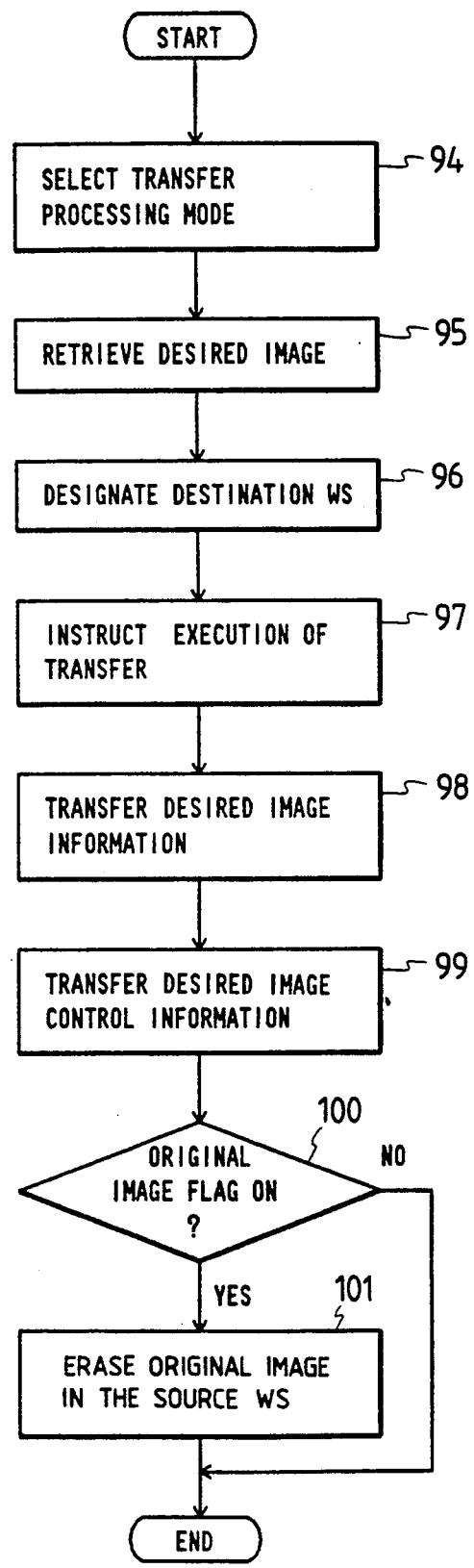

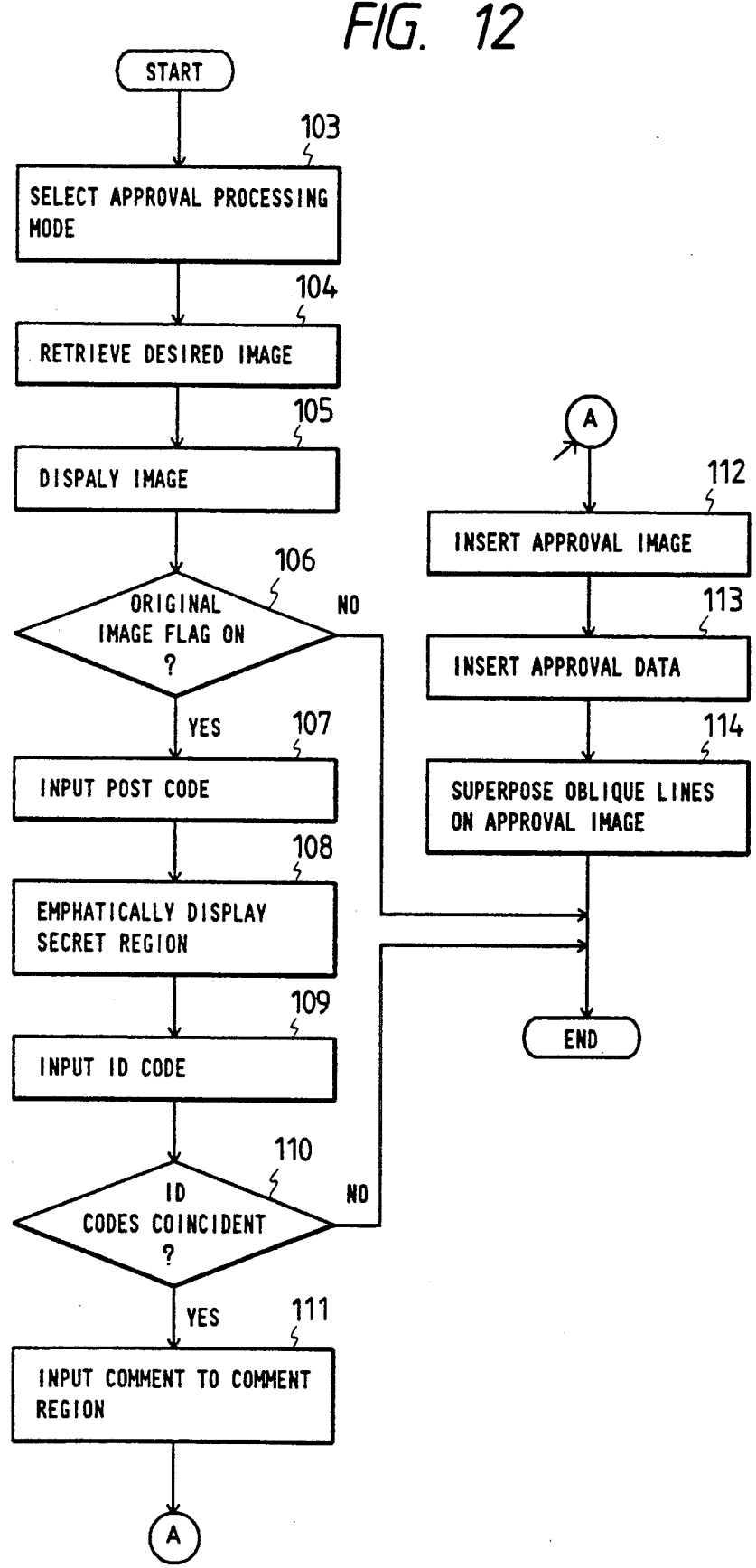

IMAGE FILING SYSTEM FOR PROTECTING PARTIAL REGIONS OF IMAGE DATA OF A DOCUMENT

This application is a continuation of application Ser. No. 369,854, filed on Jun. 22, 1989 now abandoned.

BACKGROUND OF THE INVENTION

The present invention relates to the input/output control of images in an image processing system. More particularly, the present invention pertains to the control of transfer and input/output of images in an image registering system.

In a typical conventional image processing system, a code for identification of a particular operator, that is, an ID code, is set for image data per document or file which consists of a group of documents so that the document or file image data cannot be output unless this ID code is input through a keyboard, thereby preventing a leak of secret image data.

Whether or not a document is permitted to be displayed is determined per page (i.e., per image or per frame of a display), and an operator who does not know the ID code cannot display the image on a display nor output it through a printer.

In a typical conventional image registering system, when secret image data stored in a memory, that is, image data having an ID code associated therewith, is to be revised, or an imprint of a seal is to be applied to approve the contents of the image data, this secret image data is output onto a sheet of paper through a printer according to instructions given by an operator having the ID code and the printed paper is imprinted with a seal and, thereafter, the image data thus output is re-input to the image registering system by means of a scanner. In this case, two image data, i.e., the image data before revision, that is, the original image data, and the image data after revision, must be controlled in the image registering system, which leads to problems. In order to avoid the double image data control, it is attempted in Japanese Patent Laid-Open No. 63-155256 (1988) to electronically revise or approve image data stored in a memory without outputting it onto a sheet of paper. In this prior art system, an image which is to be revised, for example, is displayed on a display, and a region of the image which is to be revised is designated with a mouse or other similar means. Then, image data for revision, for example, an imprint of a seal, a signature, a comment, etc., is input to the region to be revised so as to be mixed with the original image before the revision, thereby revising or approving the image.

The above-described prior art suffers, however, from the following problems. Since a partial region of one image cannot be kept secret, a plurality of persons who know the ID code can revise or approve not only approval or revise regions of their own but also the other persons' approval or revise regions in the same image, which leads to problems. Further, the prior art gives no satisfactory consideration to prevention of falsification of approved or revised images and avoidance of double control of images before and after approval.

In order to overcome the above-described disadvantages of the prior art, the inventors of the present invention filed an application on Jun. 22, 1988 as Japanese Patent Application No. 63-152289 (1988) in which a partial region is set in one image as desired and an ID code is input to output this partial region, thereby enabling a partial region of one image to be kept secret.

Further, the present inventors have found that, if a partial region of one image can be kept secret, it is possible for a plurality of persons to electronically revise or approve images without creating any problems.

SUMMARY OF THE INVENTION

A first object of the present invention is to provide an image processing system which is capable of keeping a partial region of an image secret and preventing falsification.

It is a second object of the present invention to provide an image processing system which enables an image to be electronically revised and approved.

It is a third object of the present invention to provide an image processing system which enables original images to be accurately and effectively controlled.

To these ends, the present invention provides an image processing system wherein a partial region of an image is set as a secret region and an ID code is put to data concerning this secret region, the data then being stored in a memory, so that, unless an ID code which is input from an operator is in a predetermined relation to the stored ID code, for example, unless these ID codes are coincident with each other, the image is selectively prevented from being displayed on a display unit, printed by a printer, or subjected to additional, writing revision, cutting on the screen. Thus, it is possible to restrict the visual output or revision of secret portions of images and therefore possible to individually control images which need to be kept secret and those which need not. Further, even an operator who does not know the ID code can see portions which are not kept secret among those of one image and it is possible to know most of the contents of the image.

In addition, an original image flag is put to an image which is first input to control it as being an original image and, when the original image is transferred to another work station, an image stored in the memory at the destination is erased. More specifically, when an image is transferred from one work station to another, the image is stored in the memory of the destination work station to replace the image which has been stored therein.

Accordingly, when a network is formed by connecting together a plurality of work stations, only one original image is present in the network at a time. Therefore, even when an image is repeatedly transferred through a network having a plurality of work stations, it is possible to prevent approval from being given to the wrong image and therefore it is possible to electronically conduct the whole approving operation on the network, that is, electronically check and approve the contents of an image.

When an original image is copied, the image flag of a copy of this image is reset (off), and when an image whose original image flag is off is displayed, the image registering system outputs the image with a "copy" mark put thereto. Thus, the operator can judge at a glance whether a particular image displayed is a copy or not. Further, additional writing, revision and cutting are inhibited with respect to all the regions of the copy. Thus, it is possible to prevent erroneous approval of a copy of an original image.

When a specific image which represents that an image has been electronically approved, for example, the approver's seal or signature, is put to an image which is to be approved, this specific image is mixed with a regular dot pattern, such as oblique (hatched) lines or halftone dots. Thus, if a specific image such as an imprint of a seal or the like which has been output on a sheet of paper is re-input to a work station, the regular dot pattern becomes irregular. Accordingly, it is possible to judge at a glance that the image has been re-input and therefore possible to prevent improper use of the specific image.

Thus, it is possible according to the present invention to set a secret region on an image, control original images accurately and prevent re-input of a specific image. Further, it is possible to realize an image registering operation in which an image is electronically approved while being transferred between a plurality of work stations.

BRIEF DESCRIPTION OF THE DRAWINGS

FIG. 7 shows one example of an approval image written into the approval region shown in FIG. 4;

FIG. 8 shows an image having a comment and an approval image written thereon;

FIG. 10 is a flowchart showing the procedures carried out to copy an image onto the optical disk;

FIG. 11 is a flowchart showing the procedures carried out to transfer an image between the work stations; and FIG. 12 is a flowchart showing the procedures carried out to give approval to an image electronically.

DESCRIPTION OF THE PREFERRED EMBODIMENTS

Embodiments of the present invention will be described hereinunder with reference to the accompanying drawings.

Figure 1:
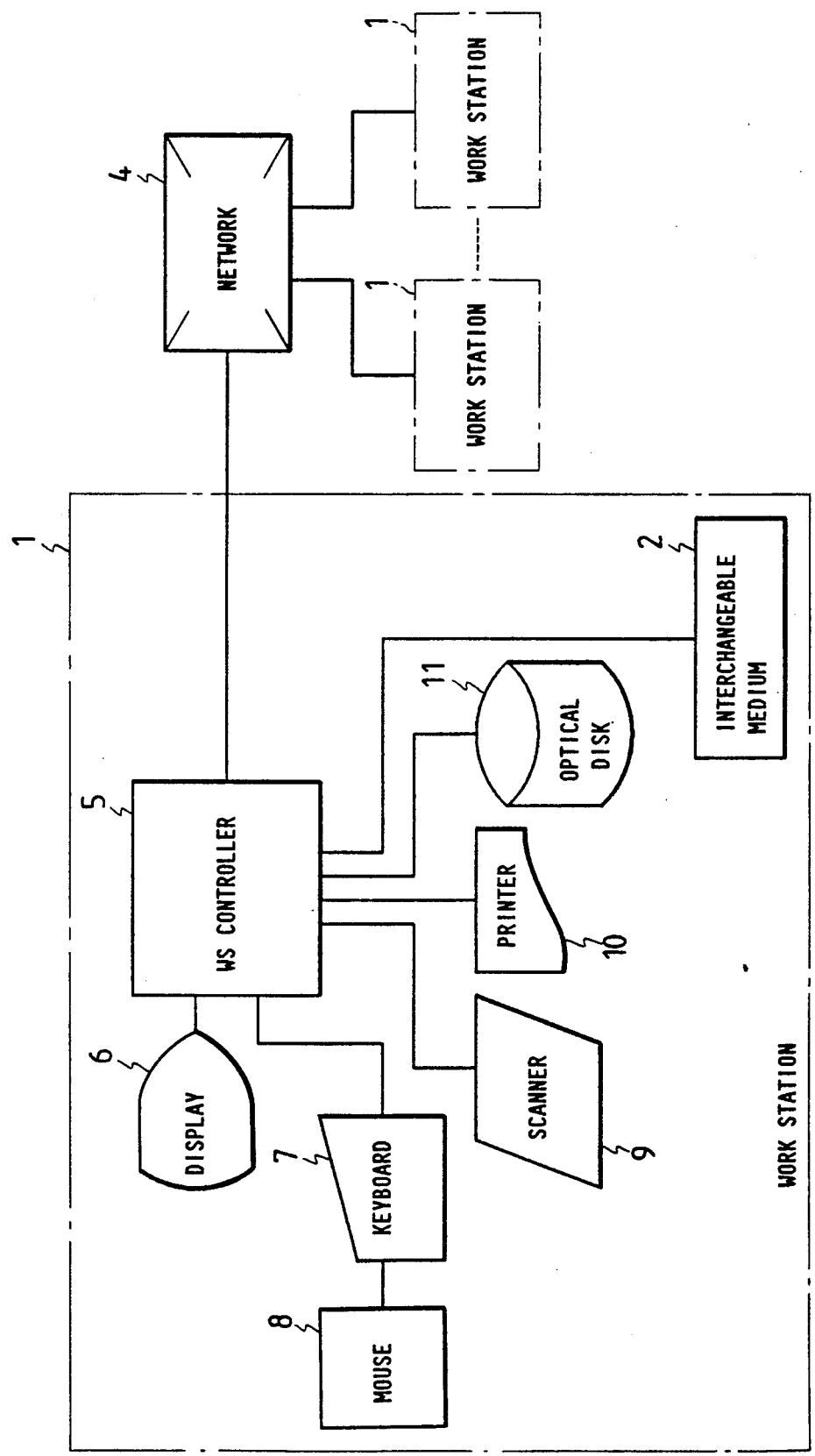
FIG. 1 is a block diagram showing one embodiment of the image registering system according to the present invention.

FIG. 1 is a block diagram showing one embodiment of the image registering system according to the present invention.

Work stations 1 are used to input, prepare, register and revise images and each have the following constituent devices in addition to a large-capacity memory, for example, an optical disk memory. A plurality of work stations 1 are connected together through a network 4 so that an image can be transferred between the work stations 1. A work station controller (hereinafter referred to as "WS controller") controls various devices included in each work station 1. A scanner 9 optically reads images such as documents, drawings, etc. A display 6 is a CRT which displays an image visually. The display 6 may take other forms, such as a liquid crystal display or the like, as a matter of course. An optical disk 11 is a memory used to store images on an optical disk memory medium. A printer 10 is an output device used to output an image onto a sheet of paper. For example, a laser beam printer or the like may be employed as the printer 10. A keyboard 7 is an input device used by an operator to control the work stations 1. A mouse 8 is a pointing device used to designate a desired position on the display 6. An interchangeable medium 2 is a floppy disk, a magnetic tape or other interchangeable storage media used to input to the work station 1 the drawing information output from a CAD (Computer Aided Design) system, the output of a word processor, etc.

Figure 2:
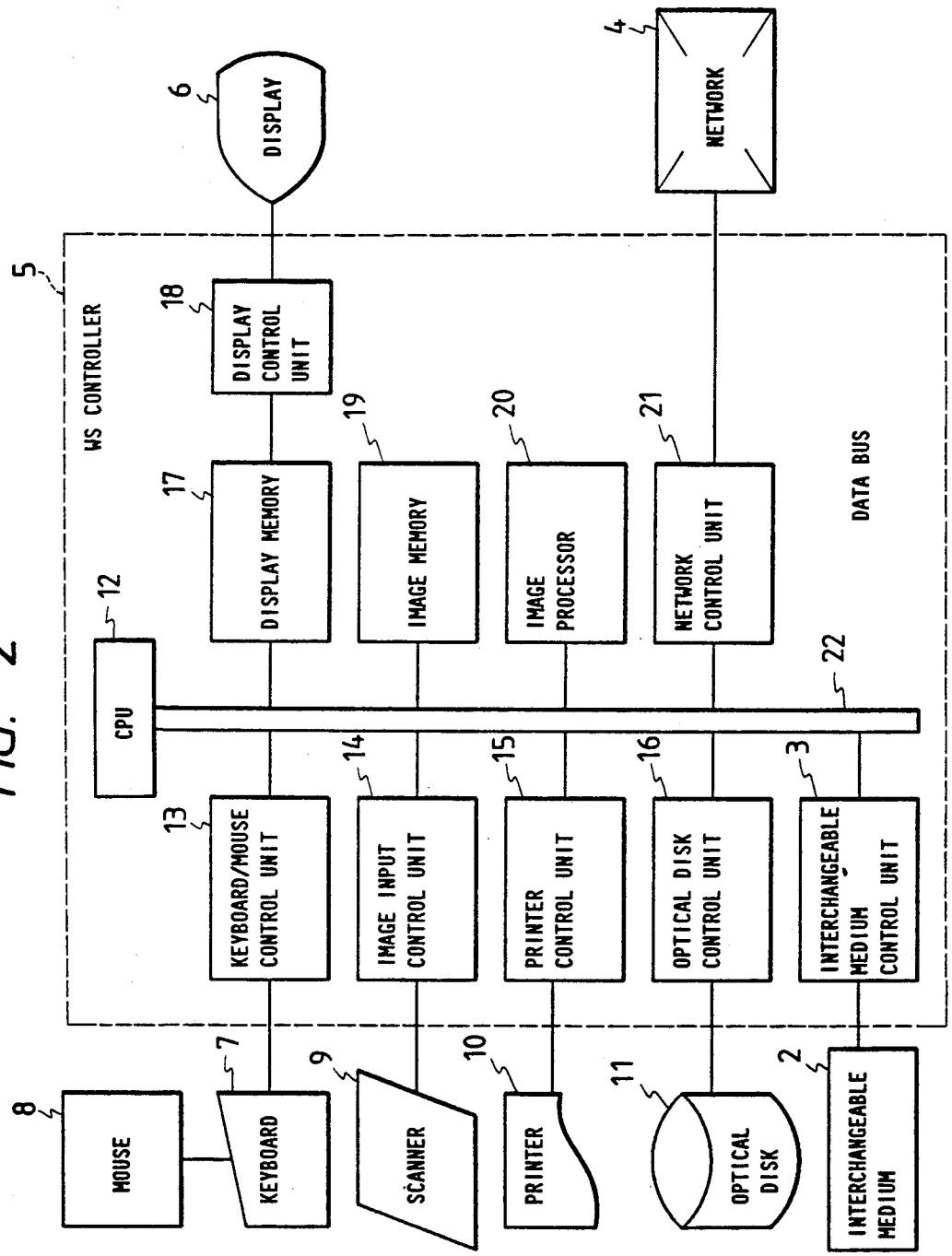
FIG. 2 is a block diagram showing in detail the work station controller shown in FIG. 1.

FIG. 2 is a block diagram showing in detail the work station controller 5 shown in FIG. 1.

A CPU (Central Processing Unit) 12 controls the whole WS controller 5. The CPU 12 incorporates a memory for storing various kinds of control data. This memory stores a program for controlling the work station 1 and also a program used to set a partial secret region. Further, the CPU 12 has a timer mechanism used to control time and date information.

A keyboard/mouse control unit 13 controls data input through the keyboard 7 and the mouse 8. An image input control unit 14 compresses an image input through the scanner 9. A printer control unit 15 controls the output of image data to the printer 10. An optical disk control unit 16 controls the input and output of information to and from the optical disk 11. An interchangeable medium control unit 3 reads information from the interchangeable medium 2 and outputs it to a data bus 22. A display memory 17 stores information which is to be displayed on the display 6. The image that is stored in the display memory 17 is displayed on the display 6 under the control of the display control unit 18. An image memory 19 temporarily stores an image, for example, an image read by means of the scanner 9. An image processor 20 carries out processing, mixing and transfer of an image on the display memory 17 under the control of the CPU 12. A network control unit 21 controls transmission and reception of images between this work station and another work station via network 4.

Figure 3A:
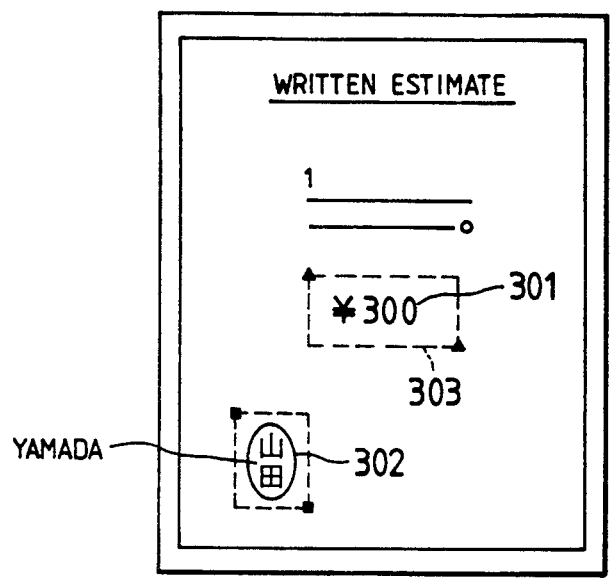
FIGS. 3(A) and 3(B) show in combination an operation conducted to keep a partial region of an image secret.
Figure 3B:
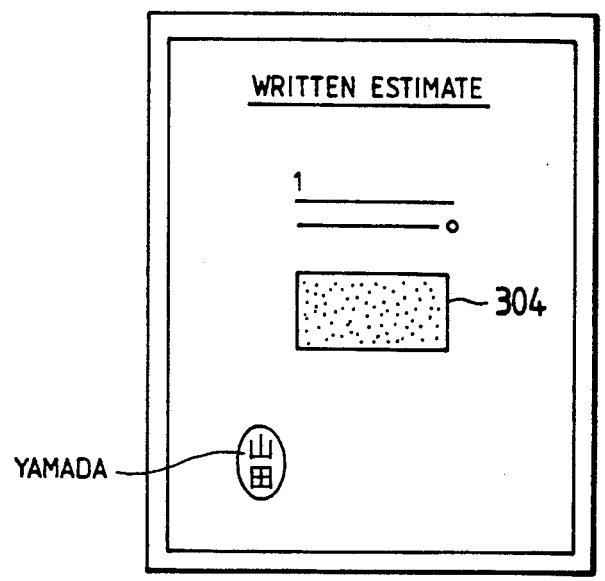

FIGS. 3(A) and 3(B) show in combination an operation conducted to keep a partial region of an image secret, that is, to set a partial secret region on an image.

FIG. 3(A) shows an image, for example, a written estimate, read by the scanner 9 and displayed on the display 6. On the written estimate, an amount of money "¥ 300" and the approver's seal "Yamada" are written. It is assumed that a money region 301 and an approval region 302 on the written estimate are set as being partial secret regions. More specifically, ID codes are assigned to these regions, respectively, so that, if ID codes which are input through the keyboard 7 are not coincident with the ID codes assigned to the secret regions, these portions are not displayed on the display 6. Secret regions are set in the manner described below. First, two points, that is, the upper left and lower right corners of an imaginary money column are designated (see the marks ▲) using the mouse 8, thereby setting a rectangular region 303 defined by these two points. The rectangular region is indicated by dotted lines and the CPU 12 reads the reference coordinate position of the upper left corner of the rectangular region 303, together with the breadth and length of the region 303, according to a program. Next, an ID code which corresponds to this partial secret region is input through the keyboard 7. This ID code may be set as desired by combining together various kinds of code, for example, a code arranged to inhibit the display of the corresponding secret region on the display 6, a code arranged to inhibit printing of the secret region by the printer 10, and a code arranged to inhibit additional writing and revision of information in the secret region. Similarly, a secret region and an ID code are set in regard to the approval region 302. When it is desired to set a plurality of partial secret regions in the same image, it suffices to repeat the above-described operation a plurality of times.

FIG. 3(B) shows an image having partial secret regions set thereon as displayed on the display 6. The figure shows an example of display in the case where no ID code is input from the keyboard 7 or the input ID code is not coincident with the ID code put to the money region 301 but the ID code put to the approval region 302 coincides with an ID code input from the keyboard 7. The money region 301 is masked with, for example, half tone dots 304 to indicate that the information in the region is secret and is not allowed to be displayed. By providing partial secret regions in this way, it is possible to inhibit display of information, for example, a money amount, which is desired to be hidden from people other than specific persons. It is also possible to inhibit printing and revision of such secret information in a similar way. Thus, there is no fear that the seal owned by the person in charge who set the estimated amount of money or the like or the approver's seal may be forged by a person who does not know the ID code. It is therefore possible to electronically conduct an approval operation on a work station.

Figure 4:
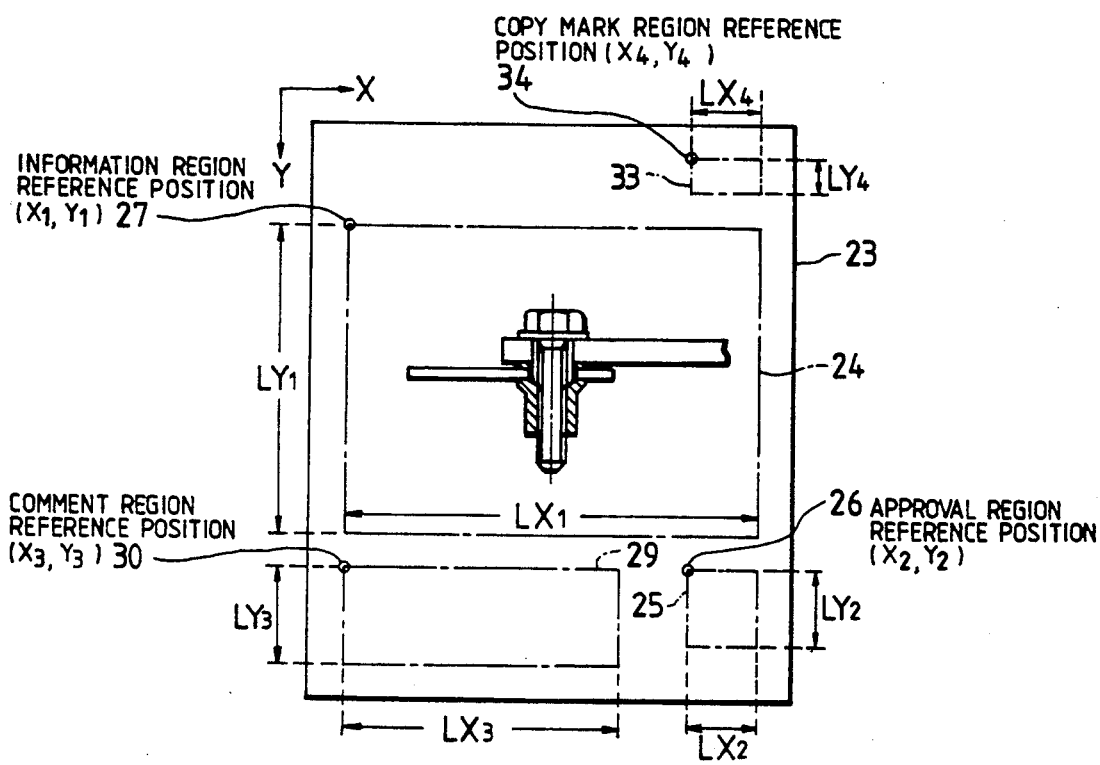
FIG. 4 shows one example of image data which is to be subjected to electronic approval processing in the embodiment.

FIG. 4 shows one example of image data which is to be subjected to electronic approval processing in this embodiment. A drawing 23 which is to be approved is one which has a size, for example, of 210 mm × 297 mm and is displayed on the display 6. The drawing 23 is input through the scanner 9 or the interchangeable medium 2. Information 24 which is to be approved is information mentioned in the drawing 23. In this example, the drawing 23 shows a sectional view of a screw joint. An information region reference position 27 is a reference position used to designate the range of the information 24 to be approved, the reference position 27 being represented by X- and Y-coordinates. The information 24 is displayed within a rectangular region which is defined by the distance $LX_1$ from the reference position 27 in the direction X and the distance $LY_1$ therefrom in the direction Y.

A comment region 29 is a region in which a person who is in a position to approve this image writes a comment or the like or inserts a new image as being additional information. An approval region 25 is a region where a person who is in a position to approve this image puts his seal or writes his signature to approve the information after examining the contents thereof. Each of the comment and approval regions 29 and 25 is a rectangular region which is defined by a comment region reference position 30 and distances respectively set in the X- and Y-directions on the basis of the reference position 30. Each of the above-described regions is set according to the procedures described in connection with FIG. 3(A).

A copy mark region 33 is a region where a mark is put in order to control the original image even more strictly and effect accurate control of reproduction of the original image. More specifically, when the original image is copied, a mark, for example, "copy", is automatically put on the copy of the original image by the system. The copy mark region 33 is a rectangular region which is defined by a copy mark region reference position 34 and distances respectively set in the X- and Y-directions on the basis of the reference position 34. It is preferable to fix the dimensions $LX_4$ and $LY_4$ of the rectangular region 33. The image of the drawing 23 to be approved is stored on the optical disk 11 incorporated in the work station 1.

Figure 5:
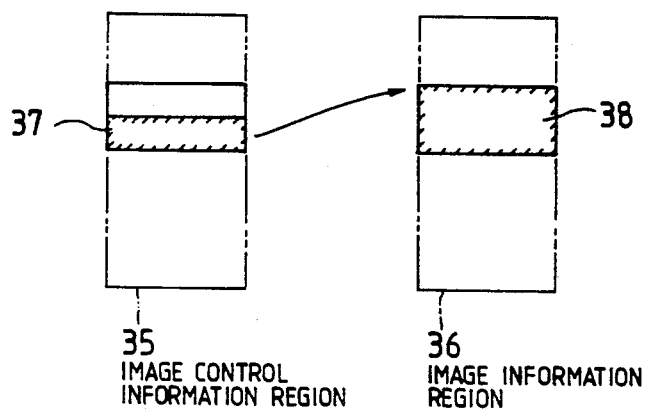
FIG. 5 shows the internal arrangement of the optical disk shown in FIG. 1.

FIG. 5 shows the internal arrangement of the optical disk 11. The optical disk 11 has an image control information region 35 for storing the titles of images and various control information and an image information region 36 for storing images in the form of binary data. The image data of the drawing 23 is stored in the image information region 36 as being, for example, the i th image information 38, and the control information for this image is stored in the image control information region 35 as being the i th image control information 37.

Figure 6:
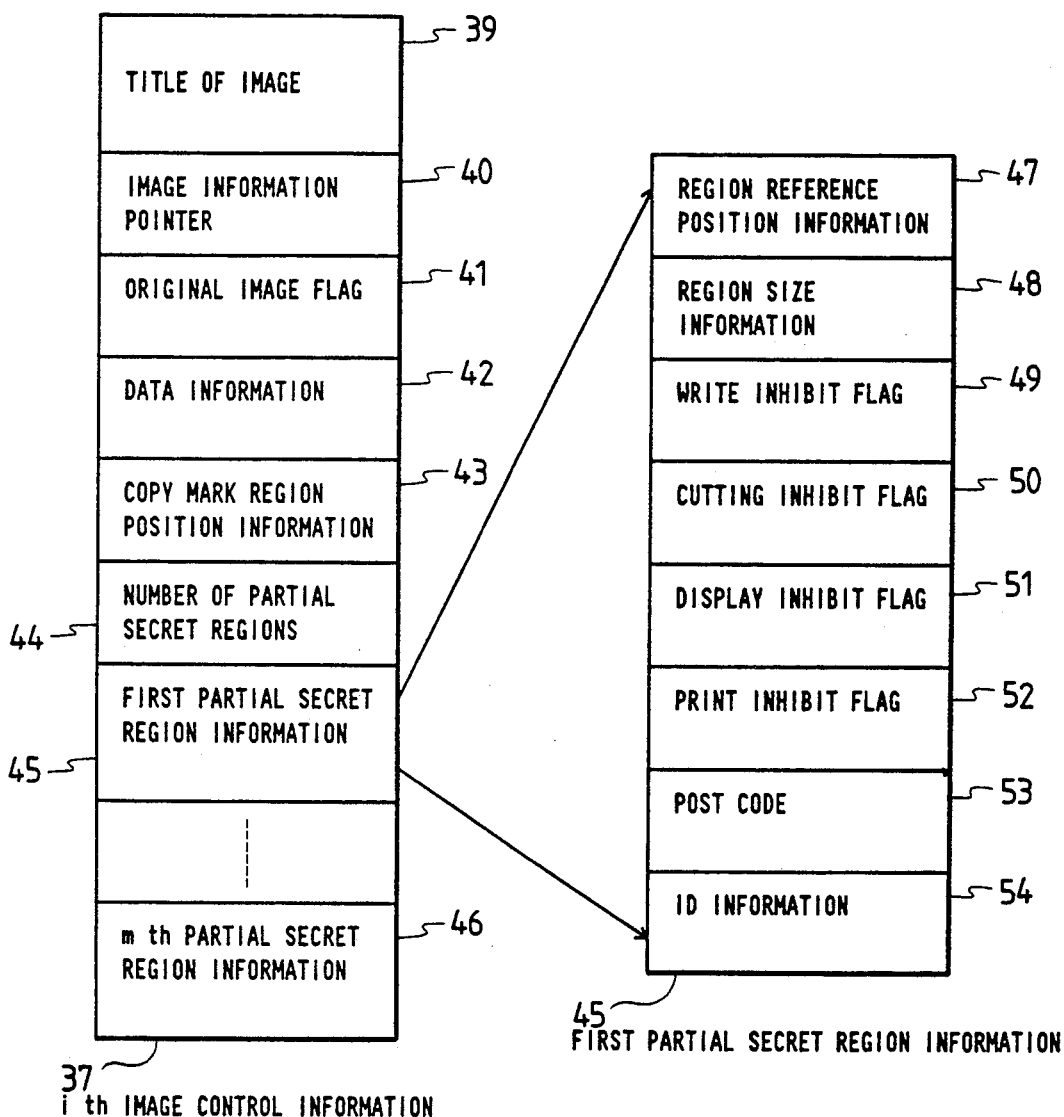
FIG. 6 shows the contents of information stored as being the i th image control information shown in FIG. 5.

FIG. 6 shows the contents of the i th image control information 37 stored in the image control information region 35. The image title 39 is the title of an image stored and is used, for example, to search for a desired image. The image information pointer 40 is address information which represents the position within the image information region 36 where the i th image information 38 is stored. The original image flag 41 shows whether an image concerned is an original image which is first input to the work station 1 or a copy of an original image. When the flag 41 is set (on), the image concerned is an original image, whereas, when it is reset (off), the image is a copy of an original image. In the region for date information 42, the date of registration of the image concerned is stored if the original image flag 41 is judged to be on. If the original image flag 41 is off, the date of execution of the copying processing is stored therein. The date information 42 is controlled by the timer incorporated in the CPU 12. The copy mark region position information 43 represents the coordinate values $(X_4, Y_4)$ of the copy mark region reference position 34 shown in FIG. 4. The partial secret regions number 44 represents the number of secret regions set on the image 23 to be approved. In this embodiment, the number 44 is three, i.e., the information 24 to be approved, the comment region 29 and the approval region 25. A number of partial secret region information which is equal to the number of partial secret regions are set, i.e., from the first partial secret region information 45 to the m th partial secret region information 46. The first partial secret region information 45 includes: region reference position information 47 containing the coordinates (X, Y) of the upper left corner of the first secret region; region size information 48 containing values for LX and LY which represent the size of the first secret region; a write inhibit flag 49 which shows whether or not writing of the first secret region is inhibited; a cutting inhibit flag 50 which shows whether or not cutting of the first secret region is inhibited; a display inhibit flag 51 which shows whether or not the display of the first secret region on the display 6 is inhibited; a print inhibit flag 52 which shows whether or not the output of the first secret region to the printer 10 is inhibited; a post code 53 containing information concerning the post or the like of the person who is in charge of the first secret region; and ID information 54 containing an ID code. The post code 53 is set to enable designation of an item which is to be approved by a particular post or position in an office organization or the like. Thus, the post code 53 contains a post number and information concerning an image which is to be approved by an operator in this post or position and a region where the operator is to put his seal of approval.

For instance, to allow only display of the first secret region and inhibit writing, cutting and printing of this region, the display inhibit flag 51 is set (on), while the write inhibit flag 49, the cutting inhibit flag 50 and the print inhibit flag 52 are reset (off).

Although in this embodiment as partial secret region information one ID code is put to one region and a plurality of items of inhibition, for example, inhibition of printing, are set for each ID code, an ID code may be set for each individual item such as display or printing of the region concerned, or a common ID code may be set for a plurality of regions. In short, a suitable method of keeping partial regions secret should be set in accordance with the requirements of the system.

FIG. 7 shows one example of the approval image 60 written in the approval region 25. In this embodiment, the approval image 60 is the seal of a person which is in charge. The approval image 60 has a breadth $LX_s$ and a length $LY_s$. When the approval image 60 is written in the approval region 25, the approval date is automatically written in an approval date insertion region 61 on the basis of the date information controlled by the CPU. The approval image 60 may be registered to the work station 1 in advance so as to be read out when the ID code is input. The approval image 60 may also be registered in a memory means, for example, an IC card, which is allotted to each operator. It is also possible to input, for example, the seal of a person who is in charge through the scanner 9.

FIG. 8 shows an image after a comment 62 and an approval image 60 have been written in the comment region 29 and the approval region 25, respectively, which are shown in FIG. 4. The approval image 60 is written together with a date and oblique (hatched) lines 64. The oblique lines are used for the following reason. If an image which has once been output by the printer 10 is re-input by the scanner 9, the oblique lines are likely to become irregular, so that it is possible to readily judge whether or not a particular image has been re-input by visual observation of the oblique lines 64. The disorder of the oblique lines 64 is caused by analog fluctuations occurring when the image is input since it is input in the form of binary coded digital signals, and also caused in relation to the line density of the scanner. Providing the oblique lines 60 in the approval image 60 also makes it impossible to attempt cutting off the approval image 60 from an image output onto a sheet of paper and inputting the cut approval image 60 through the scanner 9 to approve another information which is to be approved. Thus, the oblique lines 64 are useful in prevention of forgery. It should be noted that, although in this embodiment oblique lines are used, any pattern consisting of dots arranged regularly, for example, half-tone dots, may be employed.

Figure 9:
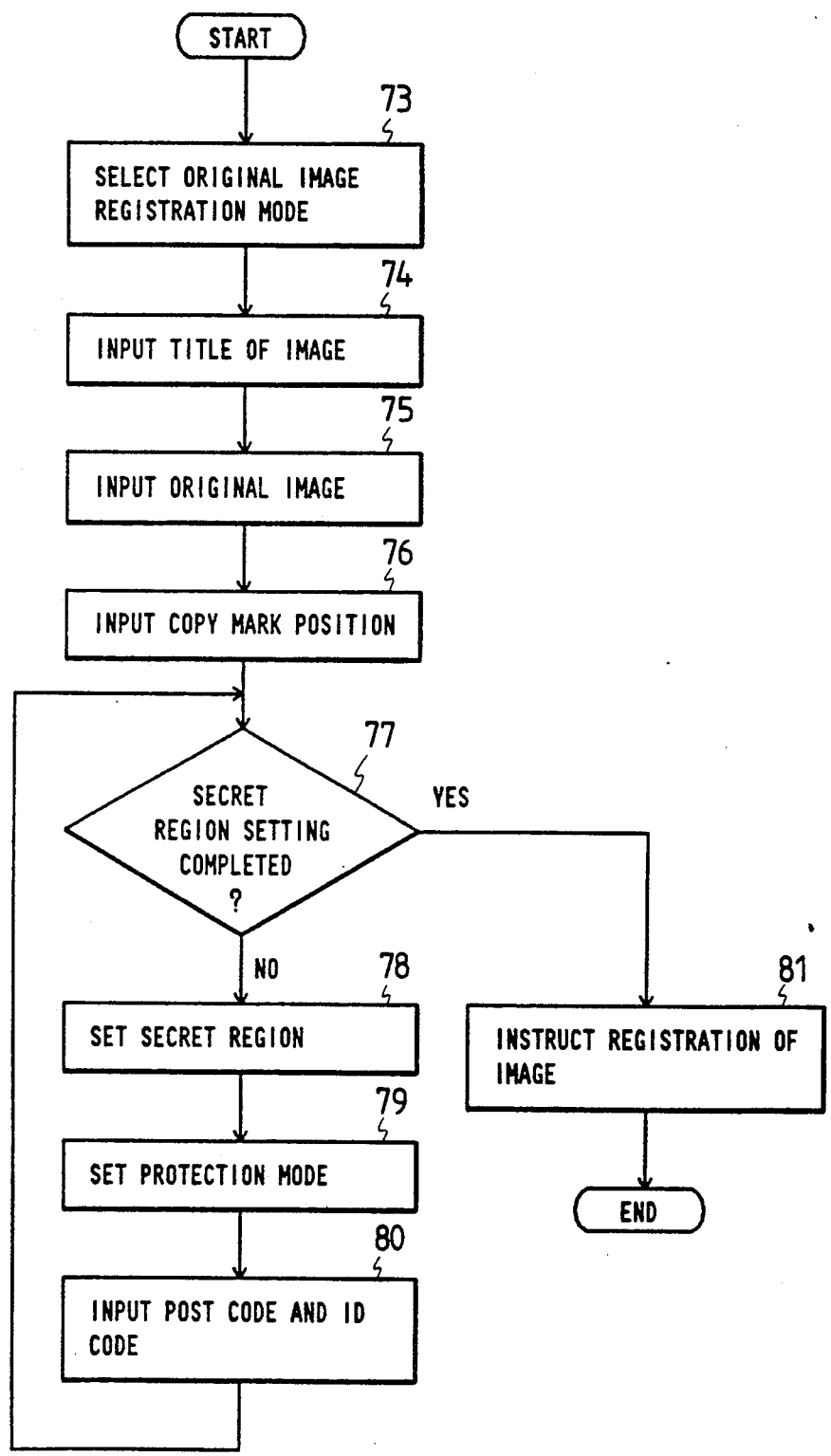
FIG. 9 is a flowchart showing the procedures for registering an original image to the optical disk.

The procedures for registering an original image will next be explained with reference to the flowchart shown in FIG. 9.

The operator sets the work station 1 in the image registration mode by actuating the keyboard 7 (Step 73) and inputs the title of an image to be input through the keyboard 7 (Step 74). Next, the original of a drawing 23 which is to be approved is set on the scanner 9 to input the image (Step 75). The input image is displayed on the display 6. Next, a copy mark position is set on the display screen with the mouse 8, as described in connection with FIG. 3 (Step 76). The copy mark is preferably set on a blank portion of the drawing 23. Next, it is judged whether setting of a secret region has been completed (Step 77). If the setting has already been completed, the input image is registered onto the optical disk 11 (Step 81). If the setting of a secret region has not yet been completed, a secret region is set (Step 78). Next, protection modes are set, that is, conditions for the following items are input: whether or not the output of the secret region to the display 6 should be inhibited; whether or not the output of the secret region through the printer 10 should be inhibited; and whether or not additional writing in or revision of the secret region on the display screen should be inhibited (Step 79). Next, a post code and an ID code are input (Step 80). In the registration of the drawing 23 shown in FIG. 3, the abovedescribed sequence from Step 78 to Step 80 is repeated three times since there are three regions which are to be kept secret.

The following is a description of the procedures carried out to copy an image stored in the optical disk 11 to, for example, another optical disk 11 in the same work station, with reference to the flowchart shown in FIG. 10.

The operator sets the work station 1 in the copy processing mode through the keyboard 7 (Step 83) and then retrieves and specifies an image which is to be copied (Step 84). Then, the operator instructs execution of copying through the keyboard 7 (Step 85). In consequence, the image stored in the image information region 36 shown in FIG. 5 is copied onto a new optical disk 11 (Step 86). Next, the image information pointer 40 that represents an address on the optical disk 11 is corrected and the date information 42 is updated (Steps 87 and 88). Further, the original image flag 41 of the copy is reset (off) (Step 89). Thus, when the copy of the original image is displayed, a copy mark is output so as to be inserted in the copy mark region 33. It is therefore possible to judge at a glance that a copy of the original image is being displayed. Further, the entire area of the image is set as being a secret region (Step 90). This is done in order to inhibit cutting, addition and revision of the whole image, thereby preventing forgery of the copy and approval from being given thereto.

The following is a description of the procedures carried out when an image is transferred between the work stations 1, with reference to the flowchart shown in FIG. 11.

The operator sets the work station 1 in the transfer processing mode through the keyboard 7 (Step 94). Next, the operator retrieves and specifies an image which is to be copied (Step 95) and, after designating a work station 1 to which the image is to be transferred (Step 96), the operator instructs execution of transfer (Step 97). In consequence, the image control information and image stored on the optical disk 11 are copied onto an optical disk 11 in the destination work station 1 (Steps 98 and 99). Next, it is checked whether or not the original image flag 41 in the transferred image control information is set (on) (Step 100). If the original image flag 41 is set (on), the transferred image is an original image, that is, an image which is to be approved. Therefore, the original image stored in the work station is erased (Step 101). In this way, the original image is moved from one work station 1 to another. Thus, there is always one original image in the network. It should be noted that, when a copy of an original image is transferred, it is judged to be a copy at a glance since a copy mark is put to the image output. In addition, since the entire area of the image of a copy is set as being a secret region, it is possible to prevent the copy from being approved.

The procedures that are carried out to electronically approve an image on each work station 1 will next be explained with reference to the flowchart shown in FIG. 12. The following description is made by way of an example in which the approver writes a comment in the comment region 29 shown in FIG. 3 and puts his seal of approval to the approval region 25.

The operator sets the work station 1 in the approval processing mode through the keyboard 7 (Step 103) and instructs retrieval of an image which is to be copied. In consequence, the desired image is retrieved from the optical disk 11 (Step 104), and the image which is to be approved is displayed on the display 6 (Step 105). Next, it is judged whether or not the original image flag 41 of the image to be approved is set (on) (Step 106). If the original image flag 41 is reset (off), the displayed image is judged to be a copy and is not one which is to be approved. Therefore, the approval processing is ended.

When the original image flag 41 is set (on), a post code 53 is input (Step 107). As a result, a secret region where information is to be input by a person in the post or position concerned is specified and this secret region is emphatically displayed, for example, by reverse display (Step 108). Next, an ID code which corresponds to the secret region emphatically displayed is input through the keyboard 7 (Step 109). If the two ID codes are not coincident with each other, the operator is not legitimate and therefore the approval processing is ended (Step 110). When the two ID codes coincide with each other, the operator writes a comment and then puts his seal of approval (Steps 111 and 112). After the seal of approval has been put, the date of approval is written in the approval region 25 (Step 113), and oblique lines are superposed on the approval region 25 (Step 114), thus completing the approval processing.

As has been described above, since a partial secret region is provided, it is possible to prevent a leak of secret information.

In addition, since a partial secret region is provided and an original image can be accurately controlled, it is possible to enable an image to be electronically approved between a plurality of electronic file units connected together through a network.

Since an image which needs to be prevented from plagiarized is output with a regular pattern, for example, an oblique line pattern, being superposed thereon, it is possible to judge at a glance whether an image displayed is a re-input one or not.

Although in the foregoing embodiment an optical disk is employed as a memory used in each work station, it should be noted that the present invention is not necessarily limitative thereto and that other types of memory, for example, a magnetic disk, may also be employed.

We claim:

1. An image processing method in an image filing system having input means for inputting image data, said image data represents characters and figures of a document, display means having a display screen for displaying said image data, and storage means for recording said image data, the method comprising the steps of:

inputting through said input means a piece of image data representative of a piece of a document which is no larger than the amount of image data capable of being displayed at one time on said display screen;

displaying on said display screen said piece of image data;

defining, on said display screen, a partial region within said piece of image data which represents a region of said document where secret image data is to be located;

assigning a specific code to said partial region;

recording said piece of image data with said specific code in said storage means;

reading said piece of image data with said specific code from said storage means in response to a read command and a code inputted by an operator;

comparing said specific code assigned to said partial region of said piece of image data with said code inputted by the operator; and displaying said piece of image data representing a piece of said document and inhibiting the display of said secret image data in said partial region of said piece of image data representing a region of said document on the display screen when said specific code recorded in the storage means and said code inputted by the operator do not coincide.

2. The image processing method according to claim 1, further comprising a step of outputting secret image data in said partial region of said piece of image data for display on the display means when said specific code recorded in said storage means and said code inputted by the operator coincide.

3. The image processing method according to claim 2, wherein said step of assigning operates to set an identification code for said partial region as said specific code.

4. The image processing method according to claim 2, further comprising a step of superposing a regular dot pattern onto said partial region in the display of said piece of image data when said specific code recorded in said storage means and said code inputted by the operator do not coincide.

5. The image processing method according to claim 2, further comprising a step of inhibiting revision of secret image data in said partial region of said piece of image data when said specific code recorded in said storage means and said code inputted by the operator do not coincide.

6. An method of copying image data from a first storage into a second storage, comprising the steps of:

inputting original image data using input means;

setting a flag with respect to said inputted image data to identify it as original inputted data;

recording said inputted image data with said flag in said first storage;

reading recorded image data from said first storage;

checking whether or not said recorded image data read out of said first storage is original inputted data by determining if it is accompanied by a flag;

superposing a visual mark on said image data read out in order to show that said read-out image data is a duplicate copy when said read-out image data is original inputted data; and recording said superposed visual mark and image data into said second storage.

7. The image copying method according to claim 6, further comprising a step of inhibiting revision of read-out image data when said read-out image data has a visual mark superposed thereon.

8. A method of transferring image data from a first storage into a second storage, comprising the steps of:

inputting original image data and image control information using input means;

setting a flag included in said image control information with respect to said inputted image data to identify it as original inputted data;

recording said inputted image data and said image control information with said flag in said first storage;

reading out recorded image data and image control information which includes a flag from said first storage;

transferring said read out image data and said image control information with said flag to said second storage;

checking whether or not said transferred image data read out of said first storage is original in putted data by determining whether said flag of said transferred image control information read out of said first storage is set; and deleting read-out image data and image control information from said first storage when said read-out image data is original inputted data.

9. An image editing method in an image filing system having input means for inputting image data, said image data represents characters and figures of a document, display means including a display screen for displaying said inputted image data, and a storage means for recording said inputted image data, the method comprising the steps of:

inputting through said input means a piece of image data representative of a piece of a document which is no larger than the amount of image data capable of being displayed at one time on said display screen;

displaying said piece of image data on said display screen;

defining, on said display screen, a partial region within said piece of image data which represents a region of said document where restricted image data is located;

assigning a specific code to said partial region;

recording said image data with said specific code in said storage means;

displaying said image data including said partial region of said piece of image data representing said document on said display screen when the specific code recorded in said storage means and a code inputted by an coincide; and permitting editing of said partial region of said piece of image data representing a region of said document displayed on said display screen when the specific code and the code inputted by the operator coincide.

10. The image editing method according to claim 9, further comprising the steps of:

displaying said image data excluding said partial region of said piece of image data on said display screen when the specific code recorded in said storage means and a code inputted by an operator do not coincide; and inhibiting editing of said partial region of said piece of image data displayed on said display means when the specific code and the code inputted by the operator do not coincide.

* * * * *